(12) United States Patent
Choi

(10) Patent No.: US 10,488,663 B2
(45) Date of Patent: Nov. 26, 2019

(54) CAP TYPE VIRTUAL REALITY DISPLAY IMAGE SYSTEM

(71) Applicant: Hae-Yong Choi, Seoul (KR)

(72) Inventor: Hae-Yong Choi, Seoul (KR)

( * ) Notice: Subject to any disclaimer, the term of this patent is extended or adjusted under 35 U.S.C. 154(b) by 169 days.

(21) Appl. No.: 15/349,482

(22) Filed: Nov. 11, 2016

(65) Prior Publication Data

US 2017/0139212 A1     May 18, 2017

(30) Foreign Application Priority Data

Nov. 12, 2015  (KR) .................. 10-2015-0158972

(51) Int. Cl.
| | |
|---|---|
| *G02B 27/01* | (2006.01) |
| *H04N 13/337* | (2018.01) |
| *H04N 13/344* | (2018.01) |
| *H04N 13/346* | (2018.01) |
| *G02B 25/00* | (2006.01) |
| *G02B 27/00* | (2006.01) |
| *G02B 27/26* | (2006.01) |
| *G06F 3/01* | (2006.01) |
| *G06T 19/00* | (2011.01) |

(52) U.S. Cl.
CPC ....... *G02B 27/0172* (2013.01); *G02B 25/001* (2013.01); *G02B 27/0093* (2013.01); *G02B 27/26* (2013.01); *G06F 3/012* (2013.01); *G06T 19/006* (2013.01); *H04N 13/337* (2018.05); *H04N 13/344* (2018.05); *H04N 13/346* (2018.05); *G02B 2027/0134* (2013.01); *G02B 2027/0138* (2013.01); *H04N 2213/001* (2013.01)

(58) Field of Classification Search
CPC .............. G02B 27/0172; G02B 25/001; G02B 27/0093; G02B 27/26; H04N 13/337; H04N 13/344; H04N 13/346
See application file for complete search history.

(56) References Cited

U.S. PATENT DOCUMENTS

| 5,347,400 A |   | 9/1994 | Hunter | |
|---|---|---|---|---|
| 5,712,649 A | * | 1/1998 | Tosaki | G02B 27/017 345/7 |
| 5,844,530 A | * | 12/1998 | Tosaki | G02B 27/017 345/8 |

(Continued)

FOREIGN PATENT DOCUMENTS

| EP | 772790 B1 | 5/1997 |
|---|---|---|
| KR | 10-2014-0195140 A | 7/2016 |
| KR | 10-2015-0009811 A | 7/2016 |

*Primary Examiner* — Joseph P Martinez
*Assistant Examiner* — Vipin Patel
(74) *Attorney, Agent, or Firm* — Bacon & Thomas, PLLC

(57) ABSTRACT

A cap type virtual reality display image system including a cap provided with an image display through which virtual reality, game, 3D game image and smart phone's image can be viewed, where a mounting hole is provided at an upper surface of the cap visor, an image display, an eyepiece lens and a reflection mirror are provided inside the mounting hole. One of the reflection mirror, the semi-transmissive reflection mirror and the spherical semi-transmissive reflection mirror is arranged to rotate on a lower portion of the cap visor, and a positioning device is provided on one surface of the cap such that an observer can view simultaneously 2D and 3D display image and external sights.

4 Claims, 15 Drawing Sheets

(56) References Cited

U.S. PATENT DOCUMENTS

| | | |
|---|---|---|
| 2002/0128541 A1 | 9/2002 | Kim et al. |
| 2012/0050144 A1* | 3/2012 | Morlock ............... G06T 19/006 |
| | | 345/8 |
| 2014/0152531 A1* | 6/2014 | Murray ................. G06F 1/1632 |
| | | 345/8 |
| 2015/0234189 A1* | 8/2015 | Lyons ................ G02B 27/0172 |
| | | 345/174 |
| 2015/0348327 A1* | 12/2015 | Zalewski .................. G06F 3/01 |
| | | 345/419 |
| 2017/0139212 A1* | 5/2017 | Choi ....................... G06F 1/163 |

* cited by examiner

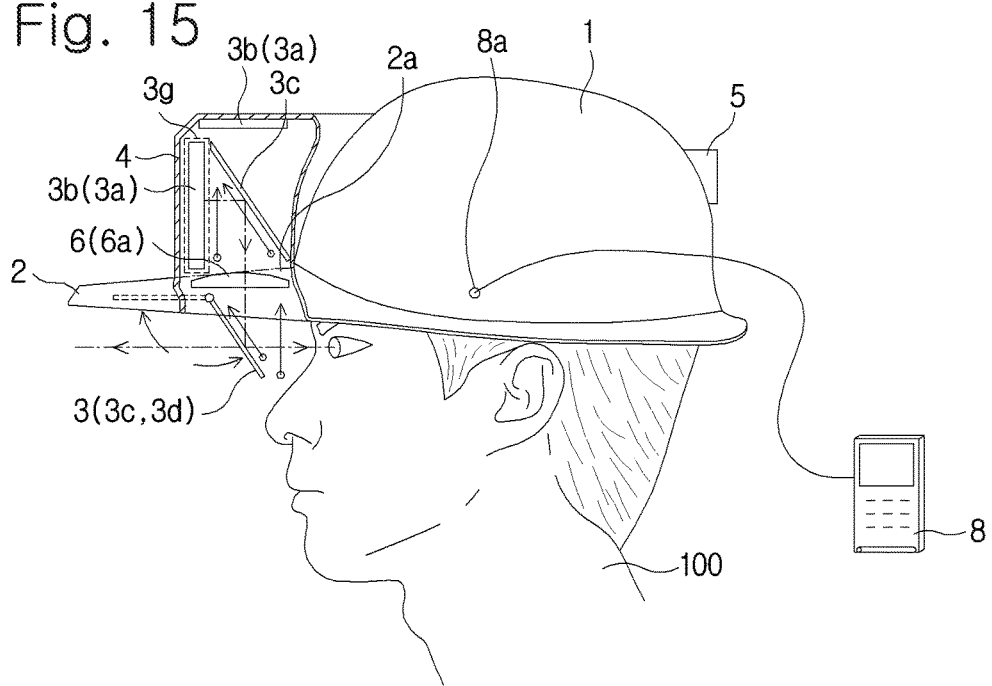

CAP TYPE VIRTUAL REALITY DISPLAY IMAGE SYSTEM

CROSS-REFERENCE TO RELATED APPLICATION

This application claims under 35 U.S.C. § 119(a) the benefit of Korean Patent Application No. 10-2015-0158972 filed on Nov. 12, 2015, the entire contents of which are incorporated herein by reference.

BACKGROUND (a) Technical Field

The present invention relates to a cap type virtual reality display image system, and more particularly, to a cap type virtual reality display image system which is arranged on a cap having a visor such as a safety helmet, a fatigue cap, a campaign hat, an outdoor cap, or the like, wherein a 2D, 3D image system, a sensor of a positioning device such as gyroscope and a semi-parent mirror are provided on upper and lower surfaces of a cap visor such that 2D, 3D images, virtual reality image and external image can be viewed simultaneously.

(b) Background Art

As background arts, disclosures of US 2002 0128541 A1, U.S. Pat. No. 5,347,400, US 2002 0128541 A1, EPO 772790 B1, KR10-2014-0195140 and KR 10-2015-0009811 are provided.

Further, a safety problem of a head mounted display (HMD), which may caused from external blocking when using it, needs to be solved. The medical experts assert commonly that the five times load or more is collected on a neck bone when a weight center of HMD is fallen to a front of eyes.

Accordingly, the load collected on the neck bone needs to be reduced by diffusing the weight of HMD.

The conventional display method such as a head mount for virtual reality which is used as eyeglass method blocks fully left and right views of a viewer and thus causes inconvenience in performing mechanical operation, driving and moving the device and using a virtual reality picture and has a limitation to utilizing the device. Further, the picture of image is very small due to the limitation to view provided by the picture even though the external image is viewed.

Meanwhile, the eyeglass type display method has a very small picture and thus the availability thereof is limited. That is, one eyed-type display device in an eyeglass type has a very small picture due to the weight of the device and a narrow interval between eyes and an eyeglass lens and thus the availability is limited extremely.

Specially, the head mount display structure is arranged on a front of eyes of a viewer such that there arises a concern that a neck may be wounded due to the weigh and volume of the device.

The devices described previously have been used as various purposes such as virtual reality, traffic guide, game or the like through various applications using a mobile phone called as a smart phone and a tablet PC; however, there arises a safety problem since the view information of surroundings is limited while viewing a picture.

Accordingly, it needs a display image device through which a viewer views virtual reality, a virtual reality game using a smart phone and image display device while moving and the neck injury is prevented while viewing the surroundings.

Patent Document

US 2002 0128541 A1
U.S. Pat. No. 5,347,400
US 2002 0128541 A1
EPO 772790 B1
KR 10-2014-0195140
KR 10-2015-0009811

SUMMARY OF THE INVENTION

The objects of the present invention are to provide a cap type virtual reality display image system in which:

A viewer can view a computer picture while he/she moves so as to execute virtual reality training while he/she moves. That is, the viewer can view an image display picture and the surrounding scene of moving place simultaneously, if necessary;

The picture provided by the system has to move to the same direction as a location of a view's moving, a rotation direction of a viewer's head and both hands of the viewer have to be free;

A viewer can view a real external surroundings and image information simultaneously while viewing virtual reality; and A personal image display device of thin film structure such as an existing smart phone or a tablet PC has to be utilized in the system.

As shown in FIGS. 1 to 15, a cap type virtual reality display image system according to the present invention may include: a cap visor of a cap having a visor; a image window hole formed through one surface of the cap visor; a mounting hole provided on an upper surface of the image window hole; an image display inside the mounting hole; a semi-transmissive reflection mirror which is provided on a lower surface of the image window hole and reflects the image incident from the image display at an oblique angle and transmits external image incident from a front; and a positioning device such as GPS, gyro, acceleration speed meter and infrared sensor, which is provided on one side of the cap, the cap visor and the image display, wherein an observer views simultaneously the image from the image display which is detected by the positioning device at the semi-transmissive reflection mirror and external sights which is transmitted through the semi-transmissive reflection mirror.

The cap type virtual reality display image system may further include an eyepiece lens which is provided horizontally on the image window hole, that is, between the image display and the semi-transmissive reflection mirror.

An insertable-detachable groove may be provided on one side of the mounting hole at an upper surface of the cap visor, into which the image display including a smart phone or a tablet PC to which the positioning device such as GPS, gyro, acceleration speed meter and infrared sensor is connected is inserted.

The image display may include a small projector and a reflective screen for projection provided on a front of the small projector.

The cap type virtual reality display image system may further include a camera device including a telescope or infrared camera, which is provided on one side of the mounting hole.

The cap visor may be connected to or separated from an existing cap such as a helmet and fatigue cap.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein:

FIG. 15 is a schematic perspective view of a cap type virtual reality display image system wherein a shortest viewing distance is ensured based on a view angle according to a fourth embodiment of the present invention.

Figure 1:
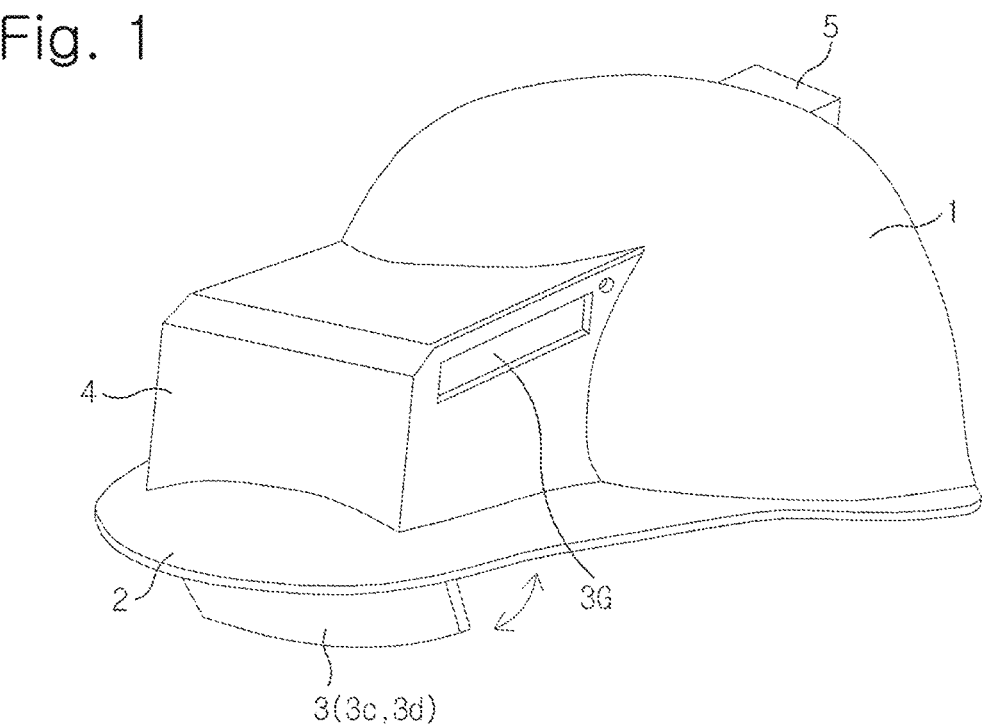
FIG. 1 is a schematic perspective view of a cap type virtual reality display image system according to the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, the present invention will be described in more detail with reference to the accompanying drawings illustrating embodiments of the present invention.

Figure 2:
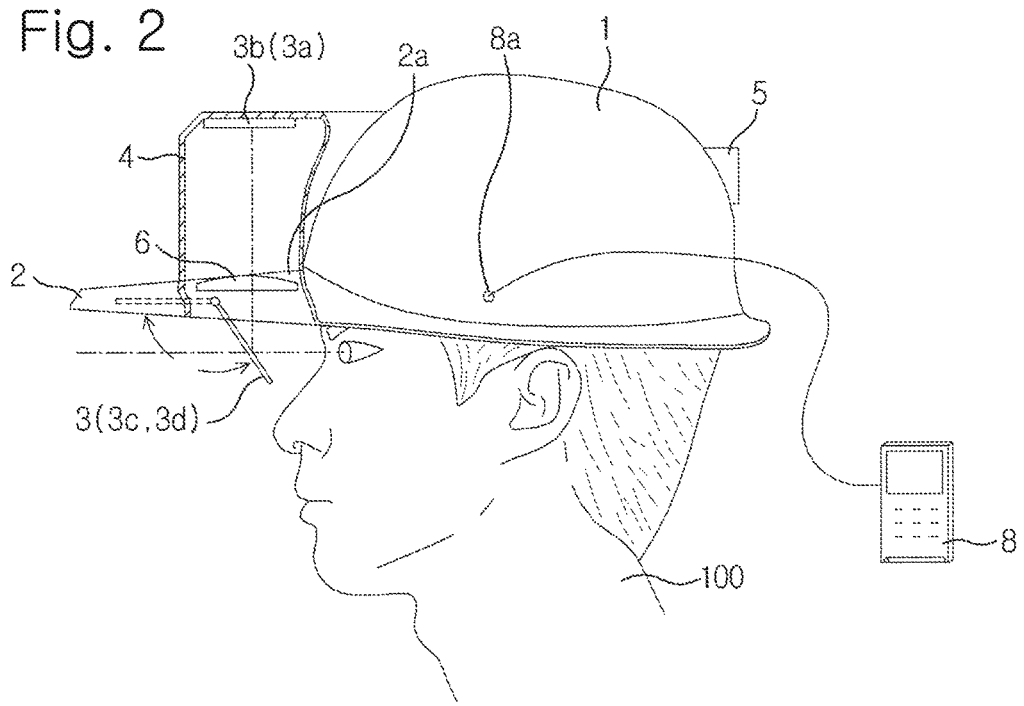
FIG. 2 is a schematic sectional front view of a cap type virtual reality display image system and a view of the system when it is used, according to the present invention.

FIG. 1 is a schematic perspective view of a cap type virtual reality display image system and FIG. 2 is a schematic sectional front view of a cap type virtual reality display image system and a view of the system when it is used, according to the present invention.

As shown in FIGS. 1 and 2, a mounting hole 4 is provided on the visor 2 of a cap 1 having a visor and an image display 3b such as LCD is provided on an internal upper end of the mounting hole 4, and the portion of the cap visor 2, which is contacted with the lower part of the mounting hole 4, is opened to form an image window hole 2a through which an image is observed.

A reflection mirror 3 is provided on a location where a lower part of the image window hole 2a and a view filed of an observer 100 are crossed and the reflection mirror may rotate but it may be fixed at an oblique angle when it is used.

Further, a positioning device 5 such as GPS, gyroscope sensor, acceleration speed sensor or the like is connected to one side of a cap 1 or the cap visor 2 and a jack 8a to be connected to the image display 3b is provided on one side of the cap visor 2 or the cap 1 having a visor to be connected an external smart phone or a small computer 8.

According to the cap type virtual reality display image system configured above the image signal from the smart phone or the small computer 8 is displayed on the image display 3b provided on an internal upper end of the mounting hole 4 on the cap visor 2 and the image is magnified subsequently through an eyepiece lens 6 arranged on the image window hole 2a on an internal lower end of the mounting hole 4 and viewed to the eyes of the observer 100 by the reflection mirror 3.

Here, the reflection mirror 3 may be replaced with a semi-transmissive reflection mirror 3c through which 10-90% of image is transmitted and 90-10% of the image is reflected, that is, a part of the image is transmitted and the rest is reflected. When the transmission is 10%, the reflection rate is 90%, and when the reflection rate is 90%, the transmission is 10%.

If the reflection rate of the mirror is 90% or more, it serves almost as a common mirror, and when the transmission is 90% or more, the reflection rate is less than 10% and thus the reflection operation becomes minute.

Accordingly, the reflection and transmission of the mirror is not defined between transmission 90-10% or reflection rate 10-90% but it may be variably based on 50% transmission and 50% reflection depending on availability.

That is, the semi-transmissive reflection mirror 3c according to the present invention may be formed in various semi-transmissive mirror types as a concave spherical mirror type, a flat mirror type, curved mirror type or the like.

According to the present invention, the semi-transmissive reflection mirror may be formed to have transmission 50% and the reflection rate 50%; however, it is not limited thereto.

According to a related art, the virtual reality image system is configured to block out view of an observer and thus the movement of the observer 100 is limited and he/she is exposed to many risks.

However, according to the present invention the semi-transmissive reflection mirror 3c is arranged on a location of the reflection mirror 3 such that a viewer can view simultaneously the image reflected from the semi-transmissive reflection mirror 3c on an internal upper end of the mounting hole 4 and the external image transmitted through the semi-transmissive reflection mirror 3c and thus can view a road and surroundings while enjoying a virtual game, using traffic information and moving.

Further, when the reflection mirror 3 is replaced with a spherical mirror type semi-transmissive reflection mirror 3d, the same effects as the semi-transmissive reflection mirror 3c can be obtained and at the same time the image from the image display 3b is reflected and magnified on a spherical surface thereof.

According to the present invention, the eyepiece lens 6 on a location of the image window hole 2a may be deleted. The eyepiece lens may control a focal distance of the observer 100 and magnify view angle thereof.

A viewer cannot view properly image at the closest distance within 25cm as an average shortest viewing distance of a human being through the eyepiece lens 6a due to discrepancy of pupil's focal distance.

Accordingly, a viewer can view the image from the image display 3b which is reflected from the reflection mirror 3 and the semi-transmissive reflection mirror 3c by adjusting the location of the eyepiece lens 6.

The location of the eyepiece lens 6 may be arranged on a front end of the image display 3b or on the semi-transmissive reflection mirror 3c; however, it may be varied and the eyepiece lens may be deleted.

Meanwhile, according to the present invention a positioning device 5 such as GPS may be attached on one surface of the cap 1 or one side of the cap visor 2. In this case, a viewer can receive the image information of address finding or location finding when he/she moves depending on the location information while viewing the image from the image display 3b.

Further, according to the present invention the information on all of location change, location moving and location direction provided through GPS, infra red sensing device, gyro, acceleration speed meter or the like provided on one side of the cap visor 2 or the cap 1 having the cap visor 2, or a smart phone or a small computer is input in a computer (not shown) or the image display 3b and thus the virtual reality information which is varied up and downward and left and rightward is provided.

The cap 1 used for the present invention may include a helmet, a sports cap, a band type cap or the like, which has the visor 2 or a visor applicable to a common cap.

That is, as shown in FIGS. 2-5, 7, 9 and 11-15, the band type cap 1 may include a fatigue cap used by a soldier, a safety helmet used in a site, a sport cap and the type or availability thereof is not limited if an image device is provided on an upper and lower surfaces of a cap visor 2 of a cap 1.

Figure 3:
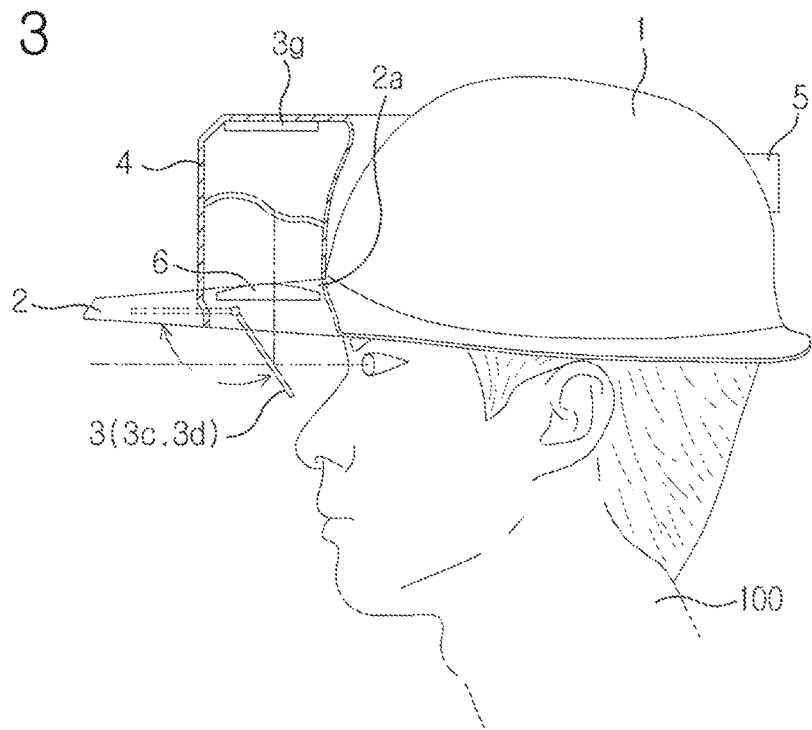
FIG. 3 is a schematic perspective view of a cap type virtual reality display image system according to the present invention when it is provided with a smart phone or a tablet PC.
Figure 4:
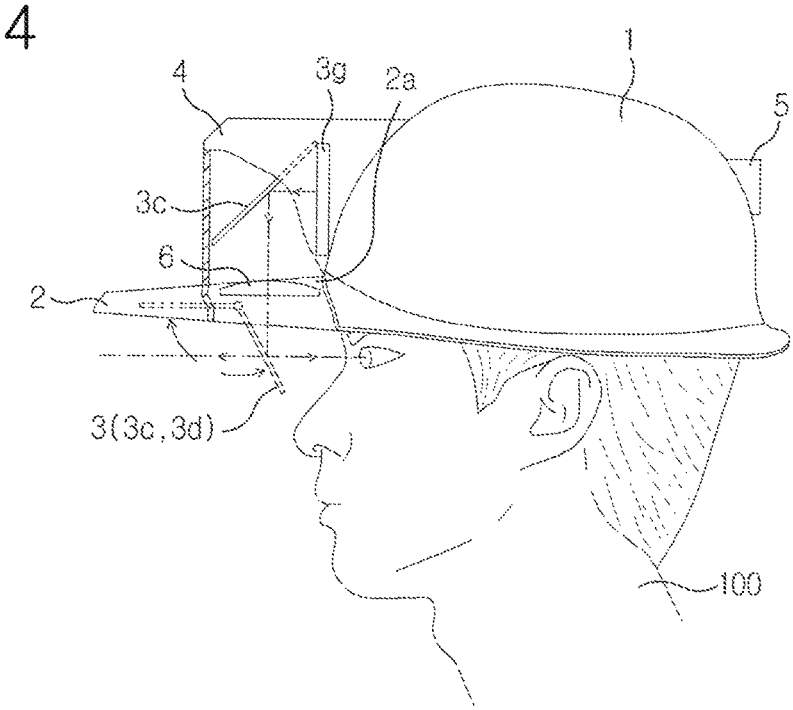
FIG. 4 is a schematic perspective view of a cap type virtual reality display image system according to a first embodiment of the present invention when it is applied.

The configurations shown in FIG. 3 and FIG. 4 are same.

That is, the image display 3d may be replaced with a smart phone or a small tablet personal computer connected to a gyroscope sensor, a positioning sensor, a GPS sensor or the like.

That is, an insertable-detachable groove 3g into which a flat image device such as a smart phone or a small tablet personal computer is attached and detached is arranged horizontally on an upper end of the mounting hole 4 in the configurations of FIG. 1 and FIG. 2.

When a flat image device of a thin film such as a smart phone is inserted into the insertable-detachable groove 3g, it serves as the same operation as FIG. 2.

FIG. 4 is a view of a structure of the cap type virtual reality display image system where the insertable-detachable groove 3g is arranged vertically such that a flat image display device such as a smart phone is mounted vertically.

The flat image configured as described above is reflected downward from the reflection mirror 3c provided on a front thereof at an oblique angle and is viewed to the eyes of the observer 100 through the eyepiece lens 6, the reflection mirror 3 and the semi-transmissive reflection mirror 3c or the spherical semi-transmissive reflection mirror 3d.

Here, the reflection mirror 3, the semi-transmissive reflection mirror 3c or the spherical semi-transmissive reflection mirror 3d are same configuration and thus one of them may be selected depending on the object and availability. Accordingly, the reflection mirror 3, the semi-transmissive reflection mirror 3c or the spherical semi-transmissive reflection mirror 3d have same concept.

However, when the reflection mirror 3 is provided, the view angle of a user has to be opened and thus the reflection mirror 3 has to be rotated up and downward such that the reflection mirror 3 is rotated to be fixed at an oblique angle when viewing the image and the reflection mirror 3 is folded to the cap visor 2 so as to ensure the view when not viewing the image.

The semi-transmissive reflection mirror 3c or the spherical semi-transmissive reflection mirror 3d may be configured based on same principle.

Figure 5:
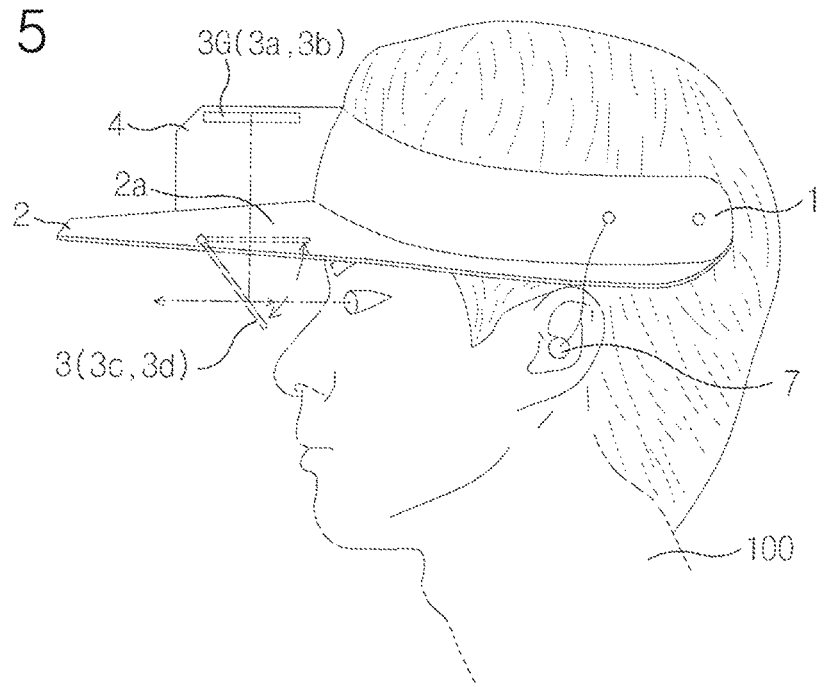
FIG. 5 is a schematic perspective view of a cap type virtual reality display image system according to a second embodiment of the present invention when it is applied.

FIG. 5 is a view of a cap type virtual reality display image system as the same as FIGS. 2-4, in which an image display is arranged on an upper and lower surfaces of a cap visor 2. However, the cap is configured as a simple band type which may be connected to or separated from an existing safety cap, a helmet for soldier or the like. The cap structure may be applied to all configuration of the present invention.

Meanwhile, the image display 3b shown in FIGS. 2-5 may be replaced with an image monitor a surface of which is formed with lenticular structure or a barrier type and through which 3D image can viewed without eyeglass.

Figure 6:
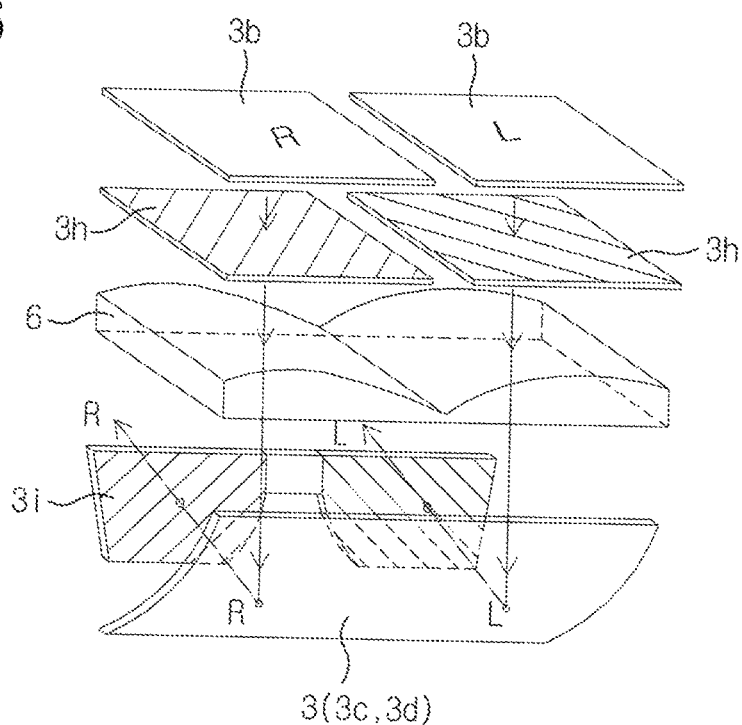
FIG. 6 is a schematic perspective view of a cap type virtual reality 3D display image system according to the present invention.

FIG. 6 is a view of a 3D image display structure wherein the image display 3b shown in FIGS. 2-5, 7, 9 and 12-15 is formed with a polarization 3D picture.

For this structure two of left and right image displays 3b for receiving and displaying the images for left eye and right eye for 3D image are provided, polarization films 3h having left and right polarization angles symmetrically are provided left and rightward below the left and right image displays, respectively, the eyepiece lens 6 are provided left and rightward below the polarization films, respectively, and the reflection mirror 3 or the semi-transmissive reflection mirror 3c is provided on a lower part of the cap visor 2. Further, a polarization eyeglass having polarization angles which are symmetric left and rightward is provided on a front surface of the reflection mirror 3.

According to the structure of the present invention, as shown in FIG. 6, the images R, L for left and right eyes are polarized by the left and right polarization films 3h, respectively, and are magnified through the eyepiece lens 6, is reflected from the reflection mirror 3 or the semi-transmissive reflection mirror 3c and then viewed to a left eye of the observer 100 as the image for left eye L and to a right eye thereof as the image for right eye R by the left and right polarization plates of the polarization eyeglass 3i, respectively, thereby 3D image can be viewed.

In this case, when the spherical reflection mirror 3d is provided for the semi-transmissive reflection mirror 3c of a spherical reflection structure, the magnified 3D image and external sight which is transmitted through the semi-transmissive reflection mirror 3c can be viewed simultaneously.

Figure 7:
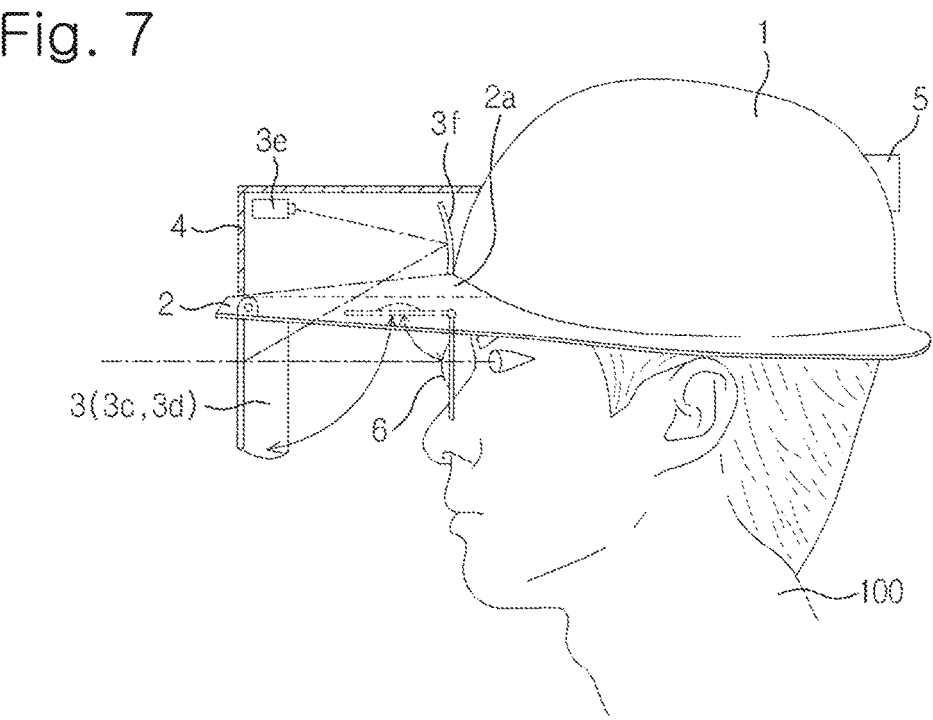
FIG. 7 is a schematic perspective view of a cap type virtual reality display image system consisted of a small projector and spherical screen according to the present invention.

FIG. 7 is a view of a display image system wherein a micro small projector 3e, a reflective screen for projection and a semi-transmissive reflection mirror 3d.

As shown in FIG. 7, a mounting hole 4 is provided on an upper surface of a cap visor 2, an image window hole 2a is provided on a portion of the cap visor 2 as a bottom surface of the mounting hole 4, and a small projector 3e is provided on a front of the mounting hole 4 and a reflective screen for projection 3f having a high reflection rate is provided on a front of the small projector.

Further, a spherical semi-transmissive reflection mirror 3d is provided on a front surface of the reflective screen for projection 3f, that is, on a lower surface of the cap visor 2 and an eyepiece lens 6 may be provided on a lower location of the reflective screen for projection 3d, if necessary.

Figure 8:
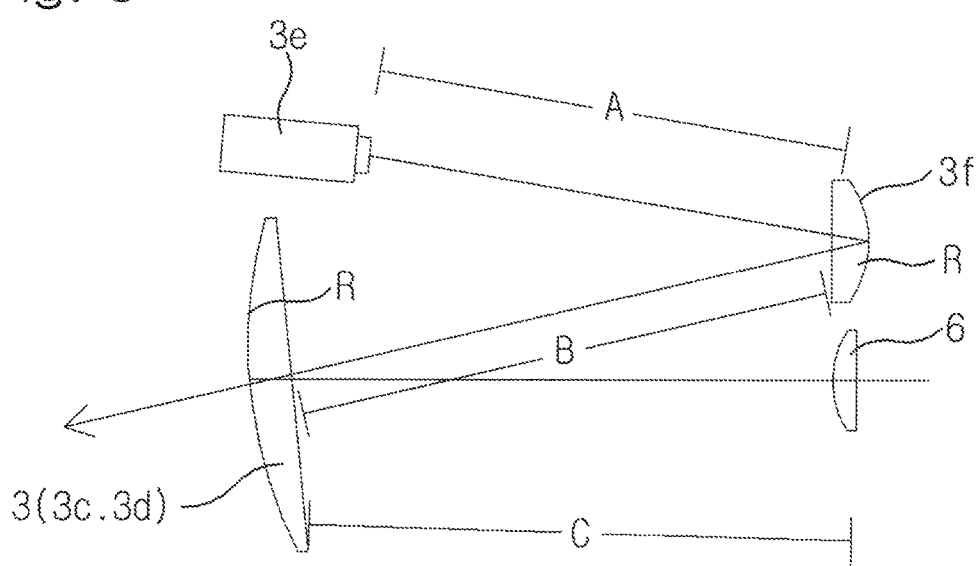
FIG. 8 is a view of an optical configuration of FIG. 7.

Under the configuration of FIG. 7 the focal distance of the curvature of the reflective screen 3f is the same as the projection distance A of the small projector 3e and the reflective screen for projection 3f is displaced on the focal distance B of the curvature of the spherical semi-transmissive reflection mirror 3d as shown in FIG. 8.

According to the configuration as described above, the image from the small projector 3e displaced on the focal distance of the reflective screen for projection 3f is reflected in a straight and thus the image without hot spots can be obtained even though a surface reflection rate of the reflective screen for projection 3f is high, and thus the surface having a high reflection rate of 80% is formed on a surface of the reflective screen for projection, thereby obtaining very bright image as 80 times as a common screen having a reflection rate of 1%.

In addition, the spherical semi-transmissive reflection mirror 3d magnifies the image from the reflective screen for projection 3f which is displaced on the focal distance thereof and thus provides two times or more bright image at the spherical surface and at the same time transmits external sights so that a viewer can view simultaneously the image from the reflective screen for projection 3f and the external sights.

Figure 9:
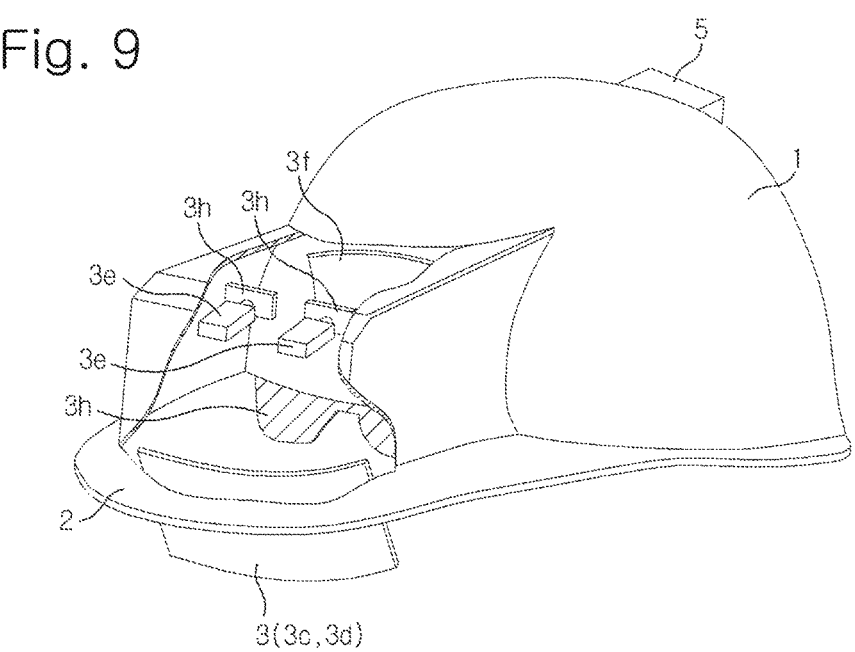
FIG. 9 is a view of a schematic perspective view of a cap type virtual reality 3D display image system consisted of a small projector and spherical screen according to the present invention.
Figure 10:
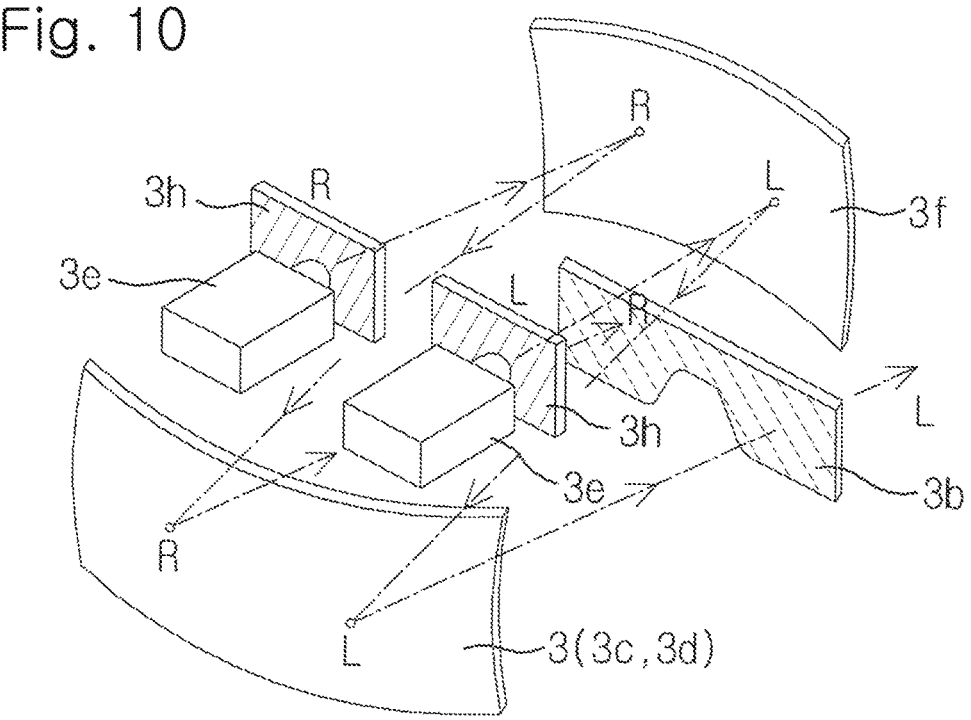
FIG. 10 is a view of a 3D optical configuration of FIG. 9.

The configurations shown in FIGS. 7 and 8 may be configured as viewing a polarized 3D image as shown in FIGS. 9 and 10.

That is, a mounting hole 4 is provided on an upper surface of a cap visor 2 a lower part of which is opened to form an image window hole 2a, two of small projectors 3e are provided left and rightward on a front surface of an upper end of the mounting hole, polarization plates 3h are provided at left and right symmetrical polarization angle on front surfaces of the small projector 3e, respectively, and a reflective screen for projection 3f is provided on front surfaces of the polarization plates 3h.

Further, a spherical semi-transmissive reflection mirror 3d is provided on a front surface of the reflective screen for projection 3f, that is, on a lower surface of the cap visor 2, and a polarization eyeglass 3i is provided on a front of an observer 100.

According to the configuration as described above, the images for left and right eyes for 3D projected from the left and right projectors 3e transmit through the left and right polarization plates 3h to form images on the reflective screen for projection 3f and the images formed on the reflective screen for projection are magnified through the spherical semi-transmissive reflection mirror 3d and reflected, and then are magnified and reflected from the polarization eyeglass 3i to be separated and viewed separately into the images for left and right eyes of the observer 100.

Of course in this case, the 3D image from the spherical semi-transmissive reflection mirror 3d and the external sights can be viewed simultaneously.

The configurations shown in FIGS. 2-5, 7, 9, and 11-15 are applied as same principle.

However, the configuration of the cap visor 2 according to the present invention is applied on an existing cap such as a helmet and a safety cap.

Figure 11:
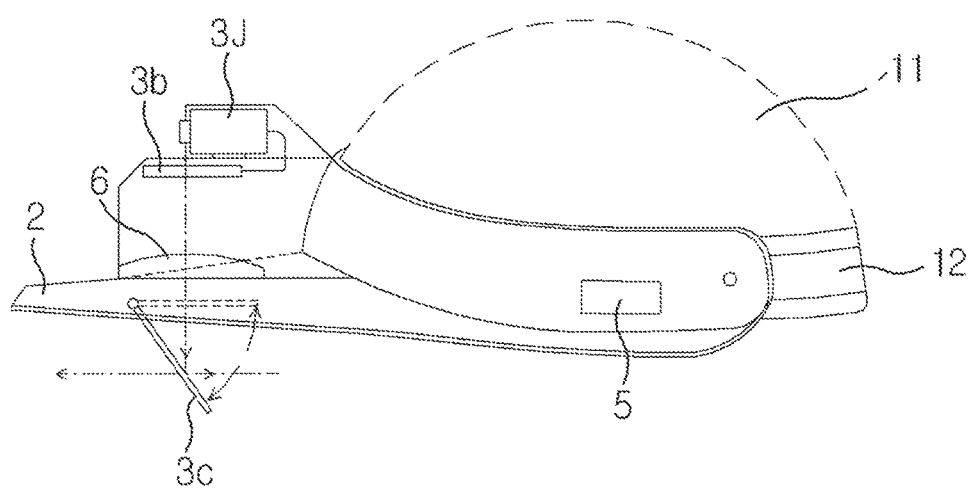
FIG. 11 is a schematic perspective view of a cap type virtual reality display image system when it is applied to infrared and image camera according to the present invention.

FIG. 11 is a view of a cap type virtual reality display image system where a viewer can view a remote distance through a telescopic lens provided on a portion of the mounting hole 4 and an infrared camera 3j to which a telescopic camera or infrared sensor is connected may be formed with same method.

The telescopic camera and infrared camera structures may be used as a camera. Here, the telescopic camera 3j is used usually for broadcasting sports, at tourism site and a play performance, and the infrared camera 3j is used usually at a fog, at a road of fog, at a cave without light, at mountain at night and at night combat wherein they may be connected to an existing cap such as a helmet, safety cap or the like. The remote image and the image at fog or at night in the telescopic camera and infrared camera 3j are photographed through the telescopic camera lens and the infrared camera lens and visible through the image display 3b, and reflected from the semi-transmissive reflection mirror 3c provided on a lower surface of the cap visor 2 at an oblique angle to be viewed to the observer 100.

A viewer can view simultaneously the image from the telescope or infrared camera and the external image transmitted through the semi-transmissive reflection mirror 3c so that it can be used very efficiently for viewing sports at a stadium, remote image at a tourism site, driving a vehicle at fog and combating at night.

Further, the display image system of the present invention may be connected to and separated from simply the exiting helmet, a safety cap or the like.

The small projector 3e, the reflective screen for projection 3f and the spherical semi-transmissive reflection mirror 3d at the display in FIG. 7 may be replaced with a telescopic camera or an infrared camera 3j.

According to the present invention, a positioning device 5 such as GPS may be provided on one surface of the cap 1, and if necessary, a speaker 7 may be provided.

The cap type virtual reality display image system of the present invention may be connected to a small computer such as a tablet PC or a mobile device including a smart phone having a function of PC. In this case, the image from the small computer is displayed on the image display 3b and reflected from the reflection mirror 3 or the semi-transmissive reflection mirror 3c to be viewed to the observer 100.

Under the configuration described above the variations of location information depending on the location while the observer 100 moves can be provided through the positioning device attached on one side of the cap 1.

Figure 12:
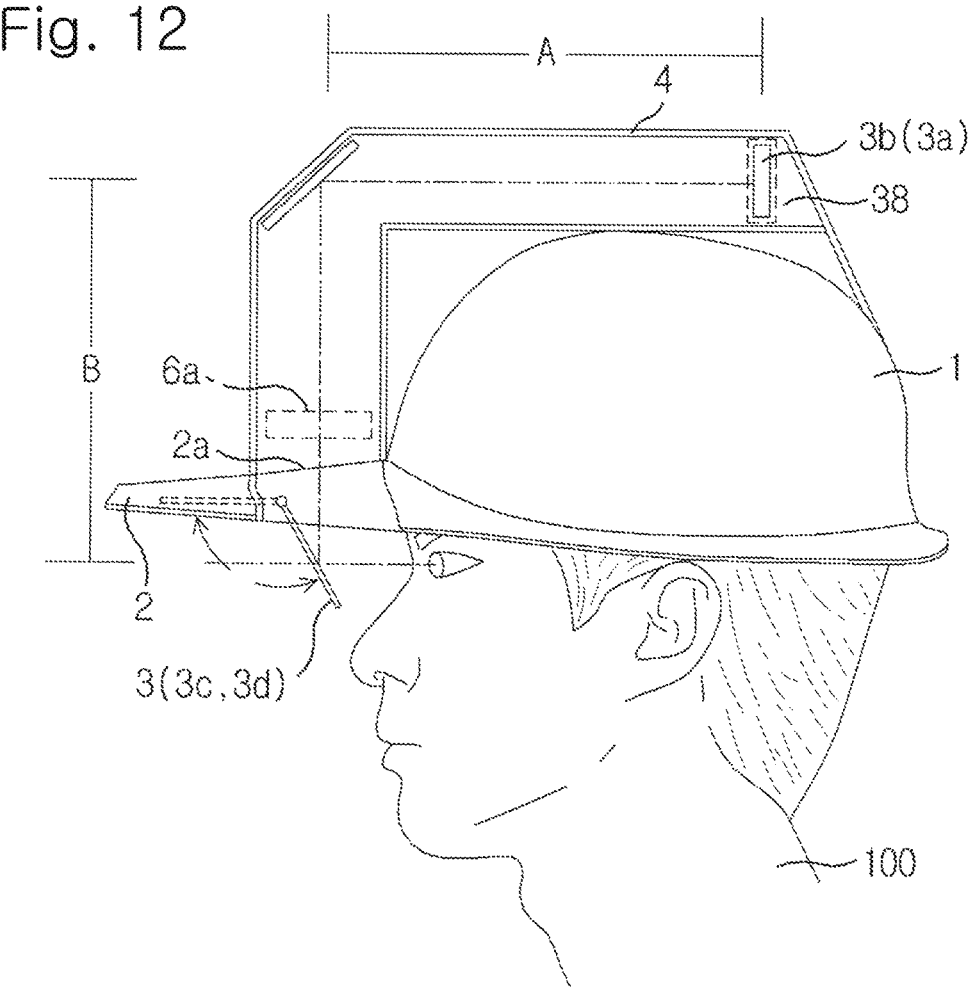
FIG. 12 is a schematic perspective view of a cap type virtual reality display image system wherein a shortest viewing distance is ensured based on a view angle according to a first embodiment of the present invention.

FIG. 12 is a view of a cap type virtual reality display image system where a part of a mounting hole 4 is provided vertically on an upper surface of a cap visor 2 of a cap 2 and the rest is extended horizontally to a rear end of the cap 1 at a right angle over the cap 1.

An insertable-detachable groove 3g into which a smart phone or a small tablet PC of a thin film structure is inserted or separated is formed on a rear end of the mounting hole 4, or a 3D monitor 3a or an image display 3b may be provided therein.

Further, a reflection mirror 3 is provided at an oblique angle of 45° inside the mounting hole, that is, on a portion of the upper portion of the cap 1 is bended at 90° over the cap visor 2.

A magnifying lens 6a may be provided on a proper location of a lower part of the reflection mirror 3, if necessary, and the location of the magnifying lens 6a may be varied vertically depending on eyesight.

One of the reflection mirror 3, the semi-transmissive reflection mirror 3c and the spherical semi-transmissive reflection mirror 3d may be arranged on a lower portion of the cap visor 2, that is, on a location below the image window hole 2a where the view of a user is crossed.

According to the configuration as described above, the distance A from the image display 3b to the reflection mirror 3 over the mounting hole 4 plus the distance B from the reflection mirror 3 to the lower reflection mirror 3 becomes about 25-30 cm and a viewer can view image without an eyepiece lens at the distance.

Accordingly, the shortest viewing distance is ensured within A+B and thus a viewer can observe the images on a smart phone which is inserted into the image display or the insertable-detachable groove 3g at a rear end of the mounting hole 4 at the upper reflection mirror 3 through the lower reflection mirror 3 without a separate eyepiece lens.

Further, when the semi-transmissive reflection mirror 3c or the spherical semi-tranmissive reflection mirror 3d below the cap visor 2 is used, a viewer can view simultaneously the image on the image display which is reflected from the semi-transmissive reflection mirror 3c and the external sights which is transmitted through the semi-transmissive reflection mirror 3d.

Figure 13:
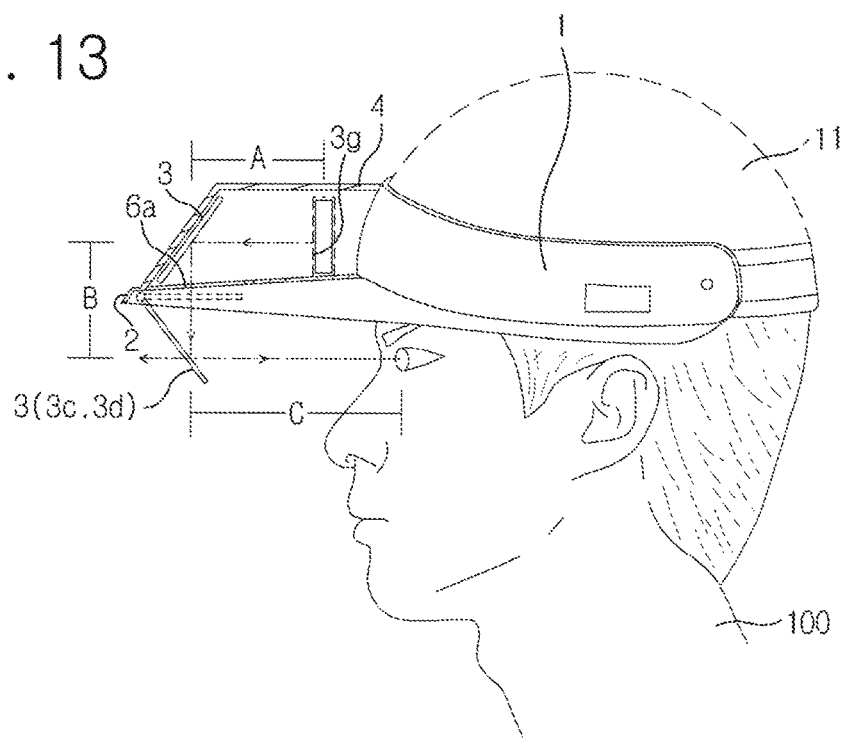
FIG. 13 is a schematic perspective view of a cap type virtual reality display image system wherein a shortest viewing distance is ensured based on a view angle according to a second embodiment of the present invention.

FIG. 13 is a view of an image display 3b configured such that a mounting hole 4 is provided on an upper surface of the cap visor 2, a reflection mirror 3 is provided at an oblique angle on a front, that is, on an upper surface of the image window hole 2a where the cap visor is formed and a smart phone or a small tablet PC is mounted on and separated from the front, that is, a rear end of the mounting hole 4, similar to FIG. 12.

One of the reflection mirror 3, the semi-transmissive reflection mirror 3c and the spherical semi-transmissive reflection mirror 3d is provided on a lower surface of the image window hole 2a on a front of the cap visor 2.

According to the configuration configured as described above, the shortest viewing distance of the observer 100 can be ensured as 25 cm or more by a summation distance A+B+C of the distance C from the eye 10 of an observer to the reflection mirror 3 at a lower part of the cap visor 2, the distance B from the reflection mirror 3 to the reflection mirror 3 at an upper part of the cap visor 2 and the distance A from the reflection mirror 3 at an upper part of the cap visor 2 to the image display 3b at a rear end of the mounting hole 4, and thus a viewer can view the image from the image display 3b without a separate eyepiece lens.

Figure 14:
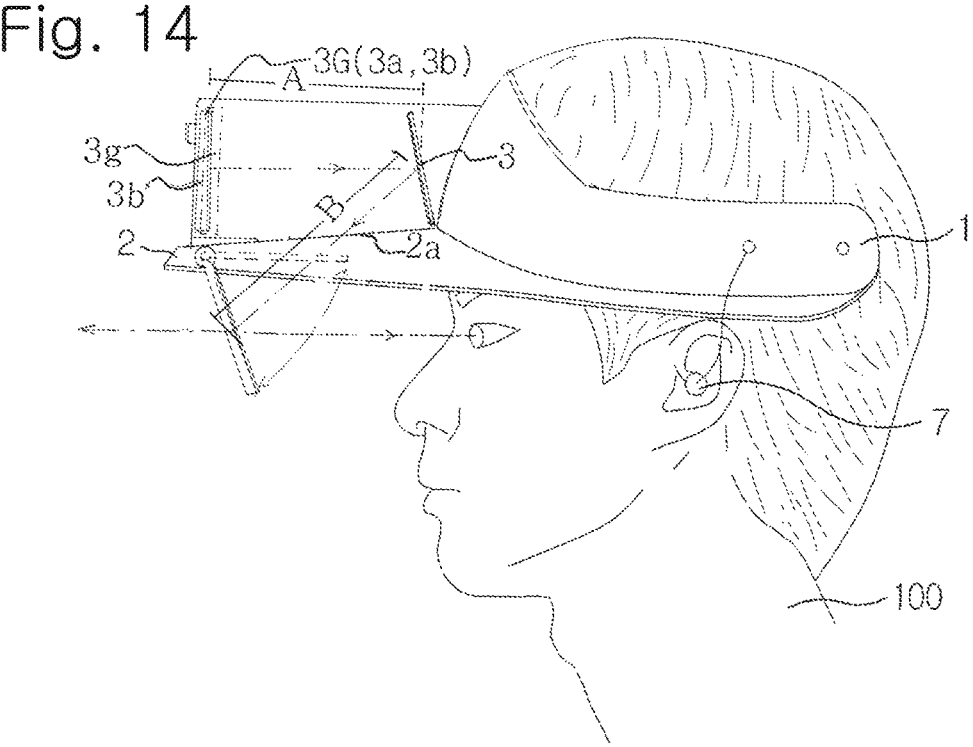
FIG. 14 is a schematic perspective view of a cap type virtual reality display image system wherein a shortest viewing distance is ensured based on a view angle according to a third embodiment of the present invention.

As shown in FIGS. 14 and 15, an insertable-detachable groove 3g into which the image display 3b or a small image display such as a smart phone of a thin film structure is inserted and attached is formed on a front of the mounting hole 4 provided on an upper surface of the cap visor 2, the reflection mirror 3 is provided on a front of the image display 3b at an oblique angle and one of the reflection mirror 3, the semi-transmissive reflection mirror 3c and the spherical semi-transmissive reflection mirror 3d, which rotates front and rearward, is arranged on a lower front of the cap visor 2.

In the case of FIGS. 14 and 15, a camera lens is directed toward a front of the mounting hole 4 by 3D sensor, a camera device, an infrared photographing device, telescope device or the like to take pictures.

According to the present embodiment, when the image display 3b is provided in the insertable-detachable groove 3g on an upper part of the cap visor 2 or an image display such as a smart phone is inserted through the insertable-detachable groove 3g, the image is reflected from the reflection mirror 3b on a front thereof to pass through the image window hole 2a to be reflected from the reflection mirror below the cap visor 2 or the semi-transmissive reflection mirror 3c to be viewed to the eyes of the observer 100. At this time, the observer can view simultaneously the image through the reflection mirror 3 and the image and external sights through the semi-transmissive reflection mirror 3d.

Further, according to the configuration as described above, since the images are observed at a distance spaced from the interval A between the image display 3a, 3b and the reflection mirror 3 to the interval B between the reflection mirror 3 and the semi-transmissive reflection mirror 3d and thus a viewer can view the image without a separate eyepiece lens.

Accordingly, the features of the present invention are followed as a cap 2 provided with an image display device shown in FIGS. 2-5, 7, 9, and 11-15, wherein the cap 1 has a cap visor 2 on a front, a mounting hole 4 is provided on an upper surface of the cap visor 2, an image display 3b is provided on one side of the mounting hole 4, an image window hole 2a is provided on one surface of the cap visor 2, and a reflection mirror 3 is provided on an upper surface of the image window hole 2a at an oblique angle.

Further, an image display 3b is provided on a front of the reflection mirror 3, that is, on a front end of the cap visor 2 and one of a reflection mirror 3a, a semi-transmissive reflection mirror 3d and a spherical semi-transmissive reflection mirror 3c is provided on a lower surface of the image window hole 2a.

Here, an insertable-detachable groove 3g may be provided on the location of the image display 3b and a smart phone or a tablet PC may be inserted into the groove.

Under this configuration the image from the image display provided on an upper end of the cap visor is reflected downward at an oblique angle from the reflection mirror at a front and then is reflected from one of a reflection mirror 3a, a semi-transmissive reflection mirror 3d and a spherical semi-transmissive reflection mirror 3c, which is provided below the cap visor 2 to be viewed to the eyes of an observer 100.

The configuration shown in FIGS. 2-5, 7, 9, and 11-15 may be applied itself to an existing fatigue cap, helmet or the like, may be applied to the structure shown in FIG. 6, may be applied to 3D image and may be applied to the structure shown in FIG. 10.

That is, the cap having a visor or only the cap visor provided with the display image system of the present invention may be connected to all of an existing helmet, a fatigue cap, sport cap or the like, or separated therefrom.

Further, the display image system of the present invention may be configured for one eye, if necessary, and in this case one eye observes the image information and the other eye observes external sights when he/she moves and thus the image information and the external information can be viewed simultaneously while moving.

The configuration of the cap 1 of the present invention may be applied to all kinds of caps such as a helmet for soldier having a visor, a sport cap, a safety cap, a helmet worn while driving traffic means or the like. Specially, the rear part of the cap visor 2 is configured as a belt, as shown in FIGS. 11 and 13, and it may be worn on head or may be connected to an existing cap 1.

The image display shown in FIGS. 2-5, 7, 9, and 11-15 may be co-used for both eyes or one eye.

Further, the image display 3b shown in FIGS. 2-5, 7, 9, and 11-15 or a smart phone, a small tablet PC or glassless 3D monitor, which inserted into the insertable-detachable groove 3g, may have the same principle as the image display 3b.

Accordingly, the structural features of the present invention are followings.

A mounting hole 4 and an insertable-detachable groove 3g into which an image display 3b or a small smart phone is inserted are provided on an upper part of a cap visor 2 of a cap 1, a part of the cap visor 2 is opened and an image window hole 2a is provided therethrough, polarization plate 3h or an eyepiece lens 6 is provided, and one of a reflection mirror 3 which rotates, a semi-transmissive reflection mirror 3c and a spherical semi-transmissive reflection mirror 3d through which a part of image is reflected and the other part of which is transmitted is provided on a lower part of the cap visor 2.

A positioning device 5 and a speaker to which a ear phone is connected are provided on one side of the cap 1 or the cap visor 2, and a small computer to which a portable computer, a smart phone or a tablet PC is connected is connected to the image display 3b, and a small image display glassless of a thin film such as a smart phone and a tablet PC is inserted into or separated from.

According to the present invention, as described above, one surface of a cap visor 2 is punctured to form an image window hole 2a and a mounting hole 4 in which an image display 3b is arranged is provided on an upper surface of the image window hole 2a, that is, on an upper surface of the cap visor, a reflection mirror 3 and an eyepiece lens 6 may be provided on a necessary location depending on an optical path.

Further, one of the reflection mirror 3, the semi-transmissive reflection mirror 3c and the spherical semi-transmissive reflection mirror 3d may be arranged on a lower portion of the cap visor 2, that is, on a front of eyes of an observer 100.

In addition, the display image system may be applied to all images of 2D and 3D.

According to the display image system of the present invention, the image device is provided on an upper and lower surfaces of the cap visor 2 and thus the observer 100 can allow his/her two hands be free and thus he/she can do various works or operate computer while viewing the images and further he/she can view simultaneously the images of 2D and 3D provided depending on necessity and external sights, thereby ensuring safety and device operation while moving.

Furthermore, it was shown that ⅕ or less of the weight of conventional head mounted device the load of which is fallen on eyes to accelerates the load to a neck bone is applied to the neck bone since the load is diffused over the whole head, thereby preventing neck bone injury.

In addition, the display image system of the cap visor 2 is displaced on a front of the eyes of an observer 100 such that the viewing angle of the image corresponds to the view angle of the observer.

Under the cap 1 provided with the display image system a user can use his/her two free hands for virtual reality game, virtual driving training or the like.

Meanwhile, safety can be ensured while moving. That is, by configuring the reflection mirror 3 to be rotated or viewing simultaneously the display image and external sights through the semi-transmissive reflection mirror 3c the view of a user is not blocked to ensure safety, comparing to the conventional display, and simultaneous viewing two increases greatly availability.

Further, a portable computer, a smart phone or a tablet PC may be mounted themselves and separated and a telescopic camera and infrared camera may be connected, that is, a common small camera may be connected, thereby increasing availability.

According to the present invention, as shown in FIGS. 1 to 15, the image from the small image display 3b at an upper end of the mounting hole 4 over a cap having a visor or a cap visor 2 is reflected to a lower side of the cap visor 2 and reflected to the eyes of an observer through the reflection mirror 3 or the semi-transmissive reflection mirror 3c below the cap visor 2.

The observer can view simultaneously the image reflected from the reflection mirror 3 or the computer image displayed on a monitor on an upper end of the cap visor 2, which is reflected through the reflection mirror 3c, and the external sights which transmits through the semi-transmissive reflection mirror 3c.

Further, the monitor image of a close distance image display 3b can be viewed clearly by adjusting the focal distance of the monitor image and the observer 100 through the eyepiece lens 6. Accordingly, the observer 100 can view simultaneously the image from the image display 3b and the external sights and can move while viewing the computer's image.

The image display 3b is provided on a cap itself such that the location and direction of the image display 3b follows them of the observer 100 in accordance with the signal from the positioning device such as GPS.

In more detail, a disclosed positioning device such as gyro, acceleration sensor and infrared sensor for determining space location is provided on one side of the cap and the location and direction of the image moves simultaneously depending on them of the observer in accordance with the positioning signal from the positioning device.

Further, the visual information about the surroundings is not limited while viewing the picture and thus it does not cause safety problem.

Meanwhile, a user can use virtual reality and virtual reality game while he/she moves and further the load is not collected on a beck since the load is distributed through a cap structure and thus neck injury can be prevented, comparing to the conventional head mounted display.

Furthermore, the display image system is configured as a cap type and the image display moves simultaneously depending on the view, the direction and location of the observer, not using two hands at all and thus the observer utilizes the system for virtual reality and navigation for driving.

A smart phone or a tablet PC which is used by individuals may be inserted into or separated from the display system and thus its availability is increased greatly.

The camera device 3*j* such as infrared camera is provided on one of outside and inside of the mounting hole 4 to be connected to the image display 3*b* such that the observer 100 can view simultaneously the image display 3*b* image of infrared, which is reflected from the semi-transmissive reflection mirror 3*c*, and the external sights which is transmitted through the semi-transmissive reflection mirror 3*c*. Accordingly, the observer can perceive objects at dark or fog and the location of him/her at the same view direction location and the pictures can be varied depending on the head moving front and rearward and left and rightward in relation with the positioning device such as GPS.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A cap type virtual reality display image system provided on a cap, comprising:
   a cap visor (2) provided on the cap, said cap visor comprising an upper surface and a lower surface;
   an image window hole (2*a*) formed with an opening part in a center of the cap visor through the upper and lower surface of the cap visor;
   a mounting hole (4) configured to vertically mount an image display on a front end of an upper portion of the cap type virtual reality display image system provided above the image window hole (2*a*) of the visor (2);
   a reflection mirror (3) formed as a rectangle and arranged horizontally to the image display and at a downward angle to downwardly reflect an image on the image display in a direction of the image window hole (2*a*) below the cap visor (2);
   a semi-transmissive reflection mirror (3*c*) formed as a rectangle and arrangeable at an upward angle to reflect the image of the image display from the reflection mirror (3) at a lower part of the image window hole (2*a*) below the lower surface of the cap visor (2) toward the direction of eyes of a viewer; and
   a magnifying lens (6) provided between the reflection mirror (3) and the semi-transmissive reflection mirror (3*c*),
   wherein the viewer is able to simultaneously observe a viewing angle of the image provided by the image display and a visual angle of viewing an outside at the same viewing angle.

2. The cap type virtual reality display image system of claim 1, further comprising a position tracking device comprising a gyro sensor is provided at a position where the image display is disposed.

3. The cap type virtual reality display image system of claim 1, wherein the cap visor (2) is detachable in a way such that it is configured to be combined with and detachable from an existing cap, said existing cap selected from the group consisting of a helmet, a steel cap, and a work hat.

4. The cap type virtual reality display image system of claim 1, wherein the image display is a smartphone.

* * * * *